Patented Aug. 21, 1934

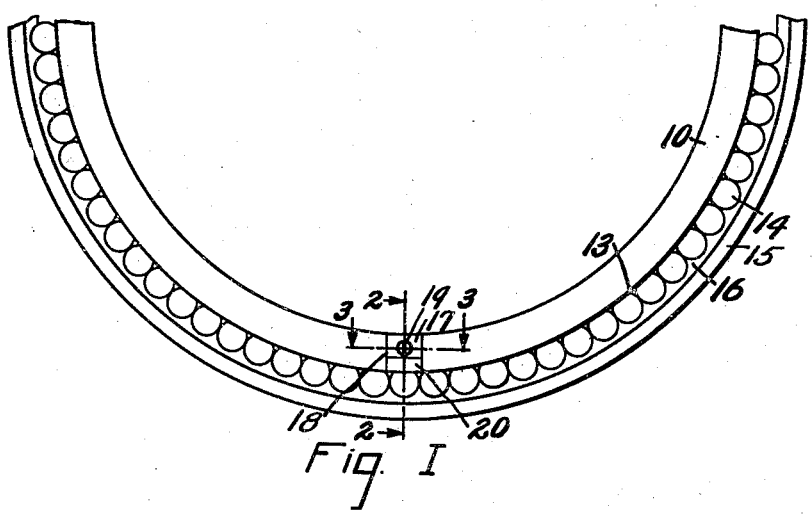
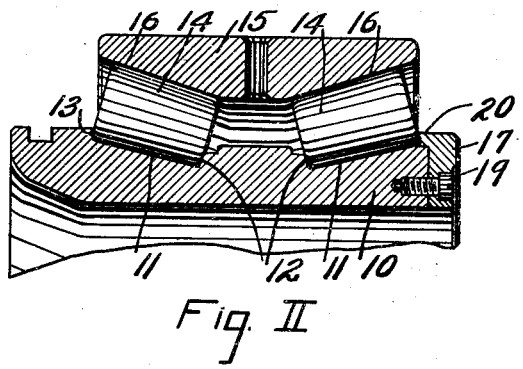
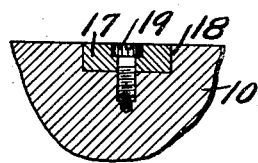

1,970,699

UNITED STATES PATENT OFFICE 1,970,699

ANTIFRICTION BEARING

Karl L. Herrmann, South Bend, Ind., assignor to The Bantam Ball Bearing Company, South Bend, Ind., a corporation of Indiana Original application September 19, 1931, Serial No. 563,717. Divided and this application February 12, 1934, Serial No. 710,815

4 Claims. (Cl. 308—214)

This application is a division of my copending application Serial No. 563,717, filed September 19, 1931, which has matured into Patent No. 1,956,289, dated April 24, 1934, and the invention disclosed therein relates to antifriction bearings and particularly to bearings provided with tapered rollers providing for radial and thrust loads.

The principal object of my invention is to provide a bearing of the class described having one-piece inner and outer race members with multiple rows of tapered rollers interposed therebetween, together with means for permitting the easy assembling of the rollers in the race-ways.

A further object is to provide a combined radial and thrust bearing having two independent rows of tapered rollers interposed between single piece inner and outer race members, together with a keeper attached to an end of the inner race member to permit assembly or disassembly of the rollers in the bearing without destroying any of the parts of the bearing.

The above being among the objects of the present invention, the same consists of certain details of manufacture and construction which will be apparent from the drawing, the same being for the purpose of illustration only and not as limiting the scope of the invention.

In the drawing in which like numerals refer to like parts throughout the several views, Fig. 1 is a fragmentary side elevation of the bearing including my invention.

Fig. 2 is an enlarged fragmentary sectional view taken on the line 2—2 of Fig. 1.

Fig. 3 is an enlarged fragmentary sectional view taken on the line 3—3 of Fig. 1, showing the keeper affixed to the inner race member for maintaining the rollers in operative position.

As stated in my copending application Serial No. 563,717, filed September 19, 1931, which has matured into Patent No. 1,956,289, dated April 24, 1934, of which this application is a division, it has heretofore been the practice to build bearings having double rows of tapered rollers with either a two-piece inner race member or a two-piece outer race member, as such constructitons were found necessary to permit assembly of the rollers in their respective race-ways. Such constructions have been costly to manufacture and otherwise unsatisfactory because of the slight inaccuracies in the several parts of the bearings and the difficulties in so assembling the several units to give the proper clearances or fit between the respective parts.

In the present invention, I have found that bearings of the type described including the single piece inner and outer race member, can be made more accurately thereby giving greater life to the bearing than in bearings heretofore manufactured and I have also devised a means whereby the rollers can be assembled and disassembled without destroying any of the working parts of the bearing which has been necessary with bearings heretofore on the market.

To better understand the invention, reference may be had to the accompanying drawing in which the inner race member 10 is provided with tapered race-ways 11, having inner end walls 12 and outer end walls 13 and cylindrical faces extending beyond the end walls. By this construction, I provide an inner race member 10 having tapered race-ways 11 and end walls 12 and 13 for each row of rollers 14. A one-piece outer race member 15 is provided with converging faces 16, as illustrated in Fig. 2, to provide race-ways for the respective rows of rollers 14. As shown in the drawing, I preferably use a full row of rollers in each race-way and thus eliminate the cage or spacer member for the rollers. I also provide a keeper 17 which is wider than the base of one of the rollers seated in a slot 18 formed in the inner race member 10 and held in position therein by the screw 19 for maintaining the rollers 14 in assembled position. The keeper 17 is preferably L-shaped in cross section and provided with a flange portion 20 having an inner face which corresponds with the end face 13 formed on that end of the inner race member and an outer face corresponding with the cylindrical face on the race member so that when the keeper 17 is mounted in the slot 18, it forms a continuation of the end face 13.

In assembling the bearing, the outer race member 15 may be slipped over the inner race member 10 and the left-hand row of rollers 14 can be interposed therebetween after which the outer race member 14 can be moved slightly farther to the left to the position shown in Fig. 2. The right-hand row of rollers 14 can then be inserted through the slot formed in the inner race member when the keeper 17 is removed. When the full row of rollers in the right-hand row has been inserted between the inner and outer race member the keeper 17 is screwed into position and the rollers are thereby locked against longitudinal movement and the bearing is completely assembled.

While I have shown one embodiment of the present invention, it will be well understood to those skilled in the art that various modifications can be made without departing from the spirit and substance of the invention and I, therefore, desire to claim the invention broadly as well as specifically as indicated by the appended claims.

What I claim is:

1. An antifriction bearing comprising, a one-piece inner race member having a cylindrical face, converging race-ways, and end walls having a slot formed in one face thereof, a one-piece outer race member having inner converging faces, tapered rollers engaging said race-ways and said faces constrained against longitudinal movement by the end walls of said race-way, and a keeper L-shaped in cross section having a face of substantially the same diameter as the cylindrical face of said inner race member and having an inwardly extending projection engageable with the end faces of the adjacent rollers detachably secured in the slot in said inner race member to permit removal of said rollers from said bearing.

2. An antifriction bearing comprising, a one-piece inner race member having converging race-ways provided with end walls and having a slot formed in one end face thereof, a one-piece outer race member having inner converging faces, tapered rollers engaging said race-ways and said faces constrained against longitudinal movement by the end walls of said race-ways, and a keeper having an inwardly extending projection engageable with the end faces of the adjacent row of rollers detachably secured in the slot in said inner race member to permit removal of said rollers from said bearing.

3. An antifriction bearing comprising, a one-piece inner race member having converging race-ways provided with end walls and having a slot formed in one end face thereof, a one-piece outer race member having inner converging faces, tapered rollers engaging said race-ways and said faces constrained against longitudinal movement by the end walls of said race-ways, and a keeper L-shaped in cross section formed to provide a continuation of the adjacent end wall and engageable with the end faces of the adjacent row of rollers detachably secured in the slot in said inner race member to permit removal of said rollers from said bearing.

4. An antifriction bearing comprising one-piece inner and outer race members each having converging race-ways, independent rows of tapered rollers engaging said race-ways, end walls formed on said inner race member to constrain said rollers against longitudinal movement, a slot formed in one of said end walls, and a keeper L-shaped in cross section detachably secured in said slot having an inwardly extending projection engageable with the end faces of the adjacent row of rollers to permit removal of said rollers from said bearing.

KARL L. HERRMANN.